UNITED STATES PATENT OFFICE.

ALVARO F. C. REYNOSO, OF PARIS, FRANCE.

IMPROVEMENT IN MEDICAL COMPOUNDS.

Specification forming part of Letters Patent No. 146,781, dated January 27, 1874; application filed January 16, 1874.

*To all whom it may concern:*

Be it known that I, ALVARO FRANCISCO CARLOS REYNOSO, of Paris, France, have invented certain new and useful Improvements in Nutritious Hygienic Compounds, of which the following is a specification:

My invention is directed to the production of certain preparations or compounds intended to serve as complemental to food by furnishing to the animal economy, under an appropriate form, definite in quantity and quality, bodies or substances which are not always found in proper proportions in ordinary food. These bodies, moreover, act as powerful agents to regulate the play of the functions of the human body.

The first preparation that I shall describe is what I term an "elixir," which, in its nature, is invigorating, nutritious, and complemental to food. This elixir is made after the following formula: Water, three hundred grams; lactophospate of lime, fifteen grams; fluoride of potassium, three-fourths of a gram; ammoniacal citrate of iron, six grams; citrate of manganese, one gram; citrate of potash, one gram.

Of the elixir thus made, a coffee-spoonful should be taken at the commencement of each meal. It can be taken in any suitable sirup, or in gaseous water, or in the form of a confection or bonbon.

The above formula may be somewhat varied, both as to the proportions of the various substances and also as to the number of the substances themselves, without departure from the principle of my invention.

The following substitutions can also be made:

First, the lactophosphate of lime may be replaced by the biphosphate of lime suitably united with lactic acid, or by a mixture of biphosphate of lime and the acid lactate of lime.

Second, the ammoniacal citrate of iron and the citrate of manganese can be replaced by other preparations of iron and manganese soluble in water—for instance, by the ferro-potassic tartrate, ferro-citrate, citro-lactate of iron, the ammoniacal pyrophosphate of iron, the pyrophosphate of iron and soda, the citrate of iron and magnesia, the pyrophosphate of iron and manganese, the citro-lactate of manganese, &c.

Third, the citrate of potash can be replaced by the citrate of soda or of ammonia.

Fourth, the fluoride of potassium can be replaced by the fluorhydrate of ammonia, and by the fluoride of sodium.

In special cases, and under the prescription and direction of a physician, there may be added to the formula above given, in proper quantity, arsenious acid or arsenic acid, or the compounds formed by the union of these acids with a base, such as potash, soda, ammonia, &c.

My second preparation is what I term a "fluorated sirup." This sirup, specially useful for infants at the period when the bones and teeth are in process of formation, is composed as follows: Lactophosphate of lime, fifteen grams; fluoride of potassium, three-fourths of a gram; water, three hundred grams; sugar in sufficient quantity.

The lactophosphate of lime and fluoride of potassium can be replaced by the substances above indicated in paragraphs numbered one and four.

A coffee-spoonful of this sirup should be taken at the commencement of each meal.

My third preparation is a sirup containing fluoride of potassium, sodium, or ammonium in the proportion of one-fourth gram to twenty grams of sirup.

The two preparations last named can be embodied in solid form—as, for instance, in confections, bonbons, &c. The preparation first described can also be in the form of a sirup, confection, bonbon, or jelly; or it may be united with any alcoholic liquid—as, for instance, with all kinds of liquors, medicinal wines, beers, &c.; or it may be united in one preparation, in some cases, with plants or vegetable products having tonic, stomachic, or stimulating properties, such as quinine, cocoa, the skin of bitter oranges, snake-root, rhubarb, gentian-root, cinnamon, cloves, vanilla, cardamom, curcuma, pepper, aniseed, camomile-flowers, absinthe, quassia amara, colombo, &c.

I make an alcoholic preparation with the wines of France or Spain by simply adding to them the substances contained in the elixir; or I combine all the stomachic, tonic, and re-invigorating elements by treating or combining wines and liquors with compounds containing the active principles of one or more of the vegetable substances above noted, and then adding the elements of my re-invigorating elixir.

What I claim as my invention, and desire to secure by Letters Patent, is—

The above-described improvements in the production and preparation of nutritious hygienic compounds from the substances specified, taken in about the proportions stated.

In testimony whereof I have signed my name to this specification before two subscribing witnesses.

ALVARO FRANCISCO CARLOS REYNOSO.

Witnesses:
HENRI DE CASTELMAN,
EMILE RICHARD.